United States Patent
Kurokawa et al.

(10) Patent No.: US 11,981,274 B2
(45) Date of Patent: May 14, 2024

(54) ONBOARD NETWORK SYSTEM

(71) Applicant: MAZDA MOTOR CORPORATION, Hiroshima (JP)

(72) Inventors: Yoshimasa Kurokawa, Hiroshima (JP); Tetsuhiro Yamashita, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 303 days.

(21) Appl. No.: 17/614,570

(22) PCT Filed: Mar. 17, 2020

(86) PCT No.: PCT/JP2020/011617
§ 371 (c)(1),
(2) Date: Nov. 29, 2021

(87) PCT Pub. No.: WO2020/250530
PCT Pub. Date: Dec. 17, 2020

(65) Prior Publication Data
US 2022/0227318 A1  Jul. 21, 2022

(30) Foreign Application Priority Data

Jun. 13, 2019 (JP) ................................. 2019-110620

(51) Int. Cl.
*B60R 16/023* (2006.01)
*H02J 7/00* (2006.01)
(52) U.S. Cl.
CPC ........ *B60R 16/0238* (2013.01); *B60R 16/023* (2013.01); *H02J 7/00* (2013.01)
(58) Field of Classification Search
None
See application file for complete search history.

(56) References Cited

U.S. PATENT DOCUMENTS

| | | | | |
|---|---|---|---|---|
| 2017/0317515 | A1* | 11/2017 | Satake | B60R 16/03 |
| 2018/0001847 | A1* | 1/2018 | Shiratori | B60R 16/023 |
| 2018/0326931 | A1* | 11/2018 | Naganishi | H02G 3/16 |
| 2018/0370465 | A1* | 12/2018 | Sato | B60R 16/033 |
| 2019/0202440 | A1* | 7/2019 | Watanabe | B60W 10/04 |

FOREIGN PATENT DOCUMENTS

| | | |
|---|---|---|
| JP | 2001-37092 A | 2/2001 |
| JP | 2016-159651 A | 9/2016 |
| JP | 2016-201740 A | 12/2016 |
| JP | 2017-200347 A | 11/2017 |

OTHER PUBLICATIONS

International Search Report and Written Opinion mailed on Jun. 9, 2020, received for PCT Application PCT/JP2020/011617, Filed on Mar. 17, 2020, 11 pages including English Translation.

* cited by examiner

*Primary Examiner* — Jared Fureman
*Assistant Examiner* — Aqeel H Bukhari
(74) *Attorney, Agent, or Firm* — XSENSUS LLP

(57) ABSTRACT

An on-vehicle network system includes, for each of a plurality of zones defined in a vehicle, a zone control unit, a power distributor connected to an on-board battery, and a plurality of electronic devices supplied with power from the power distributor via a common power supply line. Each of individual relays is interposed between one of the electronic devices and a body ground of the vehicle to individually turn on and off connection between the one of electronic device and the body ground based on a control signal from the zone control unit.

16 Claims, 7 Drawing Sheets

FIG.3

| No | VEHICLE CONDITION | INFORMATION ON ENVIRONMENT INSIDE/ OUTSIDE VEHICLE | GROUP OF UNUSED ELECTRONIC DEVICES |
|---|---|---|---|
| G1 | TRAVELING FORWARD | — | REAR SENSOR FOR PARKING, THEFT MONITORING DEVICE, EXTERNAL CHARGER |
| G2 | STOP | WITHOUT OCCUPANTS | RADARS, IN-VEHICLE CAMERAS, OUT-OF-VEHICLE CAMERAS |
| G3 | DRIVER SWITCH: OFF | BRIGHT (E.G., DAYTIME) | HEADLAMPS, CLEARANCE LAMPS, INTERIOR LAMP |
| G4 | DOOR OPEN | — | THEFT MONITORING DEVICE |
| ... | | | |

FIG.6

| No | ELECTRONIC DEVICE GROUP M1 | | ELECTRONIC DEVICE GROUP M2 |
|---|---|---|---|
| Y1 | KEYLESS ENTRY SYSTEM, THEFT MONITORING DEVICE | ↔ | STEERING SYSTEM, BRAKE SYSTEM |
| Y2 | POWER LIFT GATE, POWER SLIDING DOOR | ↔ | DOOR GLASS REGULATORS, WIPERS, WASHERS |
| Y3 | ELECTRIC PARKING BRAKE | ↔ | 4WD COUPLING SYSTEM |
| Y4 | KEYLESS ENTRY SYSTEM, THEFT MONITORING DEVICE | ↔ | AUDIO DEVICE, INFOTAINMENT DISPLAY |
| ... | | | |

# ONBOARD NETWORK SYSTEM

CROSS-REFERENCE TO RELATED APPLICATIONS

The present application is based on PCT filing PCT/JP2020/011617, filed Mar. 17, 2020, which claims priority to JP 2019-110620, filed Jun. 13, 2019, the entire contents of each are incorporated herein by reference.

TECHNICAL FIELD

The present disclosure belongs to the technical field related to an on-board network system.

BACKGROUND

Japanese Patent 1 discloses providing a gateway ECU that relays communications between ECUs of different networks and waking up only the network including a transmission target ECU to which signals start being transmitted first after all the networks have entered a sleep mode.

CITATION LIST

Patent Document

Patent Document 1: Japanese Unexamined Patent Publication No. 2016-201740

SUMMARY

Technical Problem

The technique disclosed in Patent Document 1 reduces the power consumption of an on-board communication system. There is however room for improvement. Specifically, at the time of waking up the transmission target ECU, the network (hereinafter referred to as a "transmission target network") including the transmission target ECU is woken up. Accordingly, unused ECUs are also woken up in the transmission target network, which may cause excessive power consumption.

The technology disclosed herein was made in view of the problem. It is an objective of the present disclosure to achieve individual disconnections of electronic devices without increasing the number of power supply lines.

Solution to the Problems

In order to achieve the objective, the technique disclosed herein is directed to an on-board network system including: for each of a plurality of zones defined in a vehicle, a power distributor connected to an on-board battery; a plurality of electronic devices supplied with power from the power distributor via a common power supply line; and a zone control unit configured to control the plurality of electronic devices; and individual relays each between one of the electronic devices and a body ground of the vehicle to individually turn on and off connection between the one of the electronic devices and the body ground based on a control signal from the zone control unit.

This configuration includes individual relays between the electronic devices and the body ground of the vehicle so that the zone ECU individually disconnects the unused electronic devices in accordance with the scenes or other aspects. Accordingly, the power supply to the unused electronic devices stops, which reduces unnecessary standby currents or dark currents flowing to the unused electronic devices.

In the on-board network system according to one aspect, the electronic devices, which are turned on and off at a common timing in each of the zones, are collectively connected to the body ground via one of the individual relays.

This configuration requires a smaller number of individual relays. This configuration also simplifies a negative electrode circuit connected to the body ground.

In the on-board network system according to one aspect, the vehicle includes a body ground connector electrically connected to a metal body of the vehicle and connectable to a ground wire of each of the electronic devices. Each of the individual relays is built in the body ground connector.

This configuration allows efficient placement of the individual relays.

Advantage

As described above, the technique disclosed herein allows individual disconnections of electronic devices within a zone without increasing the number of power supply lines.

BRIEF DESCRIPTION OF THE DRAWINGS

FIG. 3 is a table showing an example of unused electronic devices in scenes.

FIG. 6 is a table showing example combinations of electronic devices unused simultaneously.

DESCRIPTION OF EMBODIMENT

Figure 1:
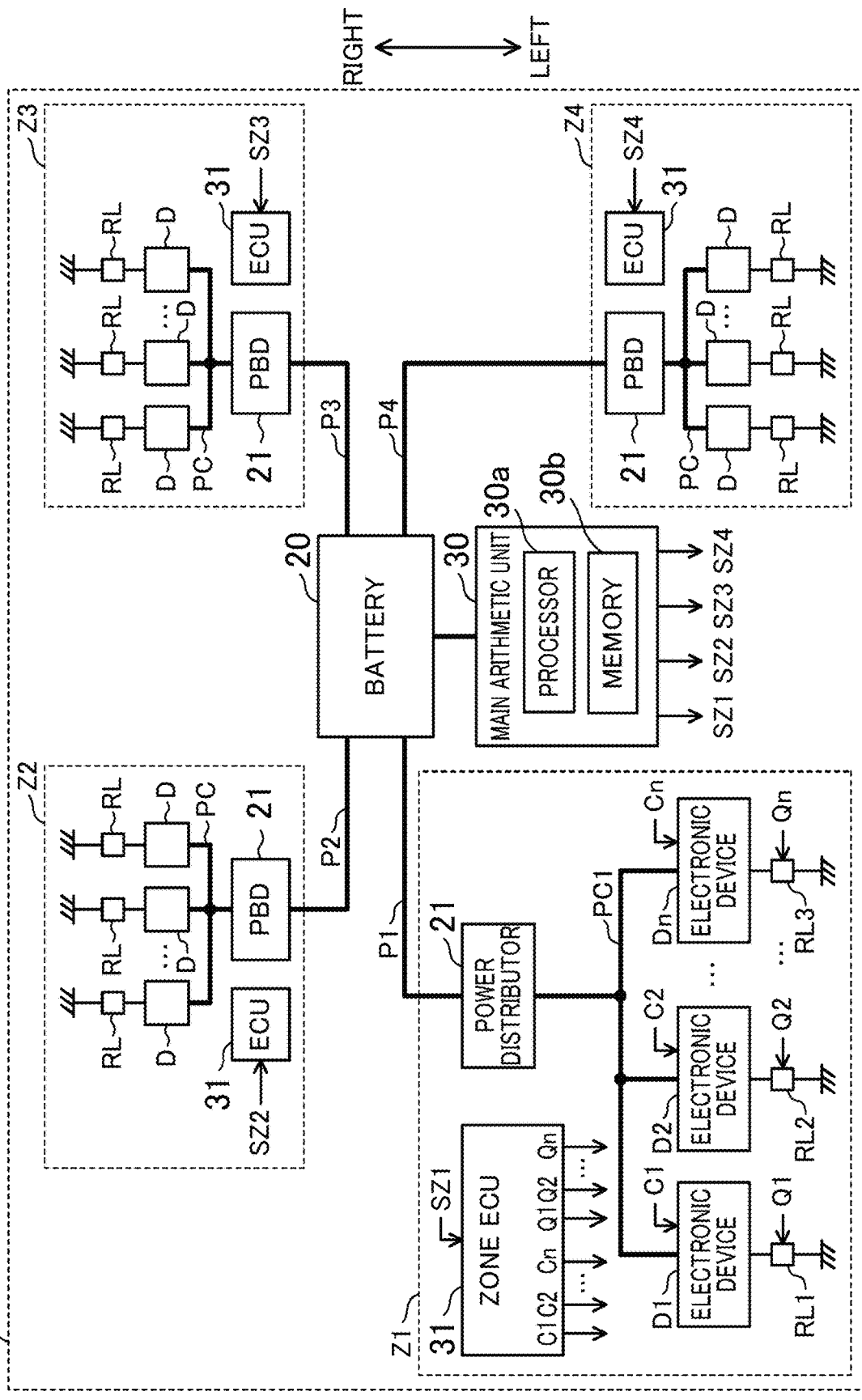
FIG. 1 is a block diagram showing a schematic configuration of a power supply topology of a vehicle.

An exemplary embodiment will now be described in detail with reference to the drawings. The following description of a preferred embodiment is merely illustrative in nature and is not intended to limit the present invention and applications or uses thereof FIG. 1 is a block diagram showing a schematic configuration of a power supply topology of a vehicle 10. In the configuration shown in FIG. 1, the vehicle 10 is divided into four zones Z. The on and off of the power supply can be controlled in each zone.

Each zone Z includes a power distributor 21, a plurality of electronic devices D, and a zone ECU 31. The power distributor 21 is connected to an on-board battery 20 via a power supply line P. The electronic devices D are supplied with the power from the power distributor via one of common power supply lines PC. The zone ECU 31 manages the electronic devices D. Each of individual relays RL is interposed between one of the electronic devices D and the body ground of the vehicle 10 to individually turn on and off the one of the electronic devices D. FIG. 1 shows an example where the plurality of electronic devices D are connected to the common power supply lines PC. Each individual relay RL is interposed between the one of the electronic devices D and the body ground of the vehicle 10. Each individual relay RL is controlled to be on and off based on control signals Q output from the zone ECU 31. The zone ECU 31 is an example of the zone control unit.

The zone ECU 31 operates in response to, for example, control signals SZ from a main arithmetic unit 30 that collectively controls the vehicle as a whole. The zone ECU 31 functions to manage and control the electronic devices D. For example, the zone ECU 31 receives results of detection by sensors to use the results for processing in the own unit or transmit the results to the main arithmetic unit 30. For example, the zone ECU 31 controls the operations of the actuators. The sensors and actuators described above are examples of the electronic devices D. The zone ECU 31 includes a processor 31a (see FIG. 2) and a memory 31b (see FIG. 2). The memory 31b stores modules that are software executable by the processor 31a. The functions of the zone ECU 31 described in the present embodiment are implemented by the processor 31a executing one or more modules stored in the memory 31b. A plurality of processors 31a and a plurality of memories 31b may be provided. The main arithmetic unit 30 includes a processor 30a and a memory 30b. The memory 30b stores modules that are software executable by the processor 30a. The functions of the main arithmetic unit 30 are implemented by the processor 30a executing one or more modules stored in the memory 30b. A plurality of processors 30a and a plurality of memories 30b may be provided.

In the following description, numerals may follow the reference characters for the sake of simplicity. For example, in FIG. 1, with respect to the zones Z, reference characters Z1, Z2, Z3, and Z4 represent the front left, front right, rear right, and rear left zones, respectively, in the traveling direction of the vehicle. With respect to the power supply lines P, reference characters P1, P2, P3, and P4 represent the power supply lines to the zones Z1, Z2, Z3, and Z4, respectively. FIG. 1 shows, in the front left zone Z1, an example where electronic devices D1, D2, . . . , Dn (n is any integer) are as the electronic devices D connected to a common power supply line PC1. Individual relays RL1, RL2, . . . , RLn are interposed between the electronic devices D1, D2, . . . , Dn and the body ground of the vehicle 10, respectively. The individual relays RL1, RL2, . . . , RLn are turned on and off based on control signals Q1, Q2, . . . , Qn output from the zone ECU 31. Reference characters C1, C2, . . . , Cn represent signals for communications between the electronic devices D1, D2, . . . , Dn and the zone ECU 31. In FIG. 1, the arrows C1, C2, . . . , Cn are directed from the zone ECU 31 toward the electronic devices D, but may be reversed or bidirectional depending on the types of the electronic devices D. For example, if the electronic devices D are sensors, output signals of the electronic devices D are input to the zone ECU 31. For example, if the electronic devices D are cameras, setting and synchronization signals of the cameras are output from the zone ECU 31 to the cameras, and imaging signals are output from the cameras to the zone ECU 31.

In FIG. 1, the zone ECUs 31, the power distributors 21, the electronic devices D, and the individual relays RL are denoted by the common reference characters. It is however not intended to indicate that the specific configurations are the same. For example, the electronic devices D include various sensors, various actuators, ECUs that control various actuators, various electronic components such as lights. The zone ECUs 31 and the power distributors 21 also have common functions in principle, but their specific functions or configurations may differ depending on the electronic devices D or other elements to be connected.

The on-board battery 20 supplies the power necessary for the operation of the vehicle 10. For example, the on-board battery 20 supplies the power to the electronic devices D (including the ECUs) mounted on the vehicle 10 and the power for driving a motor in the case of an electronic vehicle. The power supply lines P and PC only need to be electric wires capable of supplying the power and may be wire harnesses, for example.

Figure 2:
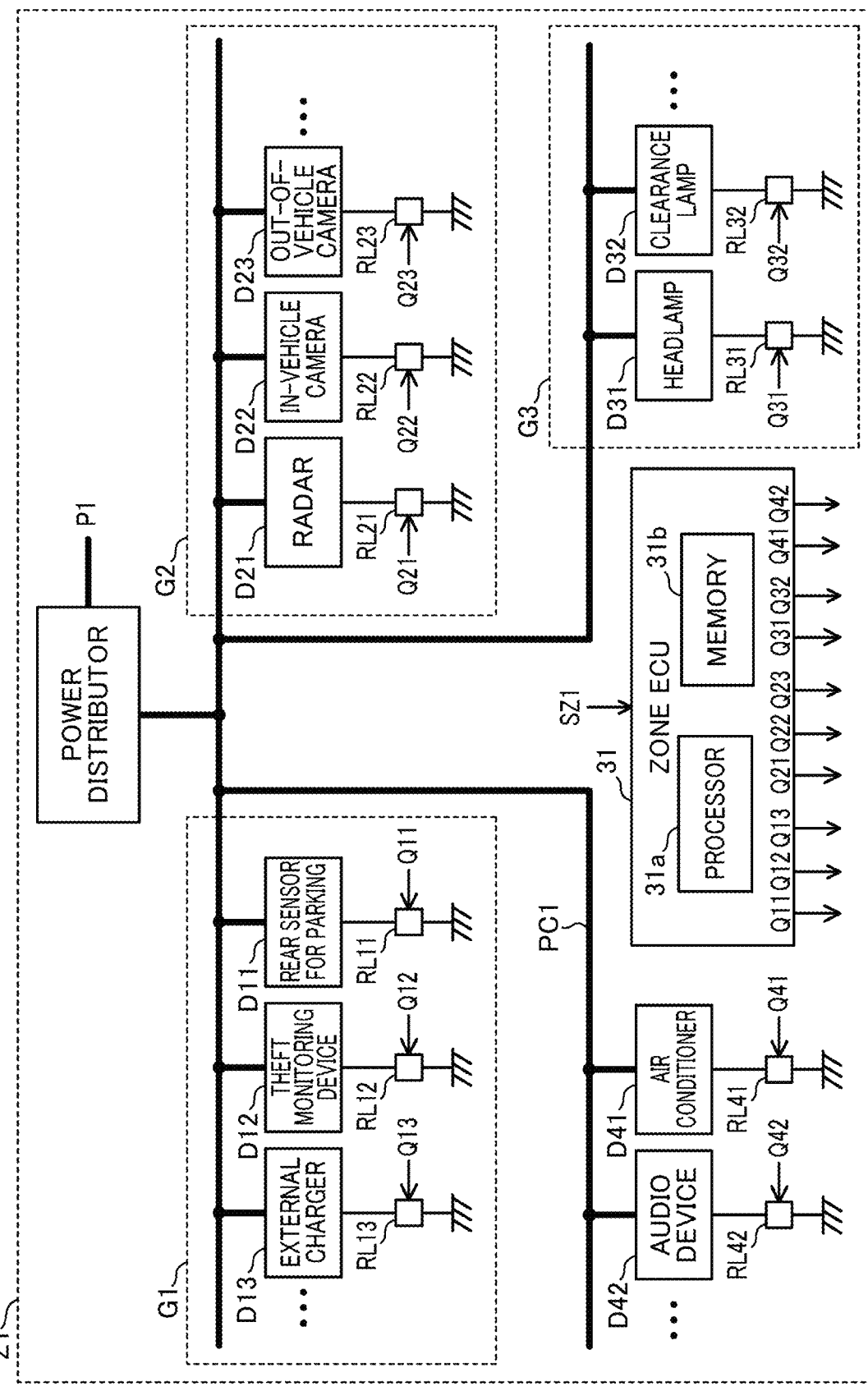
FIG. 2 is a block diagram showing an example of a power supply topology within a front left zone of the vehicle.

FIG. 2 shows an example of a power supply topology within the front left zone Z1 of the vehicle. FIG. 2 illustrates, as the electronic devices D: a rear monitoring sensor D11 used for parking (hereinafter referred to as a "rear sensor D11 for parking"), a theft monitoring device D12 for theft monitoring, an external charging device D13 used for external charging, radars D21, in-vehicle cameras D22, out-of-vehicle cameras D23, headlamps D31, clearance lamps D32, an air conditioner D41, and an audio device D42. D11 to D13, D21 to D23, D31, D32, D41, and D42 may be collectively and simply referred to as the "electronic devices D".

In FIG. 2, as described above, the electronic devices D are supplied with the power from the on-board battery 20 via the common power supply line PC1 connected to the power distributor 21. The individual relays RL for individually turning on and off the electronic devices D based on the control signals Q from the zone ECU are interposed between the electronic devices D and the body ground of the vehicle 10. In FIG. 2, as in the case of FIG. 1, the reference numerals corresponding to the electronic devices D follow the reference characters of the individual relays RL and the control signals Q.

The configuration described above allows the zone ECU 31 to individually disconnect the unused electronic devices D in accordance with the conditions, driving scenes, external environment of the vehicle or other factors. For example, when the rear monitoring sensor D11 and the theft monitoring device D12 are not used while the vehicle 10 travels forward, the zone ECU 31 controls and turns off the individual relays RL11 and RL12. On the other hand, for example, when the radars, the in-vehicle cameras, and the out-of-vehicle cameras are not used while the vehicle 10 stops, the zone ECU 31 controls and turns off the individual relays RL21 to RL23. Accordingly, the power supply to the unused electronic devices D stops, which reduces unnecessary currents (including operating currents, standby currents, and dark currents) flowing to the unused electronic devices D. In addition, the zone ECU 31 grasps, in advance, the electronic devices D to be turned off and thus instructs the electronic devices D to store necessary parameters or extracts or stores setting data as necessary to collect or store information necessary for the next activation.

Some of the electronic devices D are unused in common in some scenes. The electronic devices D unused simultaneously in some scenes may be collectively controlled.

FIG. 3 shows an example of a table obtained by grouping the electronic devices D shown in FIG. 2 and unused simultaneously in some scenes. For example, a group G1 in FIG. 3 is an example group of the electronic devices unused while the vehicle 10 "travel[s] forward". The group G1 includes, for example, the rear sensor D11 for parking, the theft monitoring device D12, and the external charging device D13. Similarly, a group G2 is an example group of the electronic devices unused while the vehicle 10 "stop[s]" without any occupant. The group G2 includes, for example, the radars D21, the in-vehicle cameras D22, and the out-ofvehicle cameras D23. A group G3 indicates the group of the electronic devices unused when the "driver switch" of the vehicle 10 is "off" and the external environment is "bright" as in the daytime. The group G3 includes, for example, the headlamps D31, the clearance lamps D32, and an interior lamp. In FIG. 2, each group of G1 to G3 is surrounded by a broken line. Note that there may be some electronic devices D out of the groups.

The scenes may be determined based on the information obtained by, for example, (1) the plurality of out-of vehicle cameras D23, (2) the plurality of radars D21, (3) a position sensor (not shown) (4) a vehicle condition sensor (not shown), (5) an occupant condition sensor (not shown), and (6) a drive operation information acquisition unit (not shown). The cameras D23 are arranged on the body or other parts of the vehicle 10 and capture images of the environment outside the vehicle. The radars D21 are arranged on the body or other parts of the vehicle 10 and detect objects, for example, outside the vehicle. The position sensor detects the position of the vehicle 10 (i.e., obtains vehicle position information) utilizing a global positioning system (GPS). The vehicle condition sensor includes outputs of sensors such as a vehicle speed sensor, an acceleration sensor, and a yaw rate sensor, detecting the behavior of the vehicle, and obtains the information on the conditions of the vehicle 10. The occupant condition sensor includes the in-vehicle cameras D22, for example, and obtains the information on the conditions of an occupant(s) of the vehicle 10. The drive operation information acquisition unit is for detecting the drive operation of the driver. While the determination on the scene is mainly executed by the main arithmetic unit 30, some of the scenes may be determined by each zone ECU 31 independently.

Figure 4:
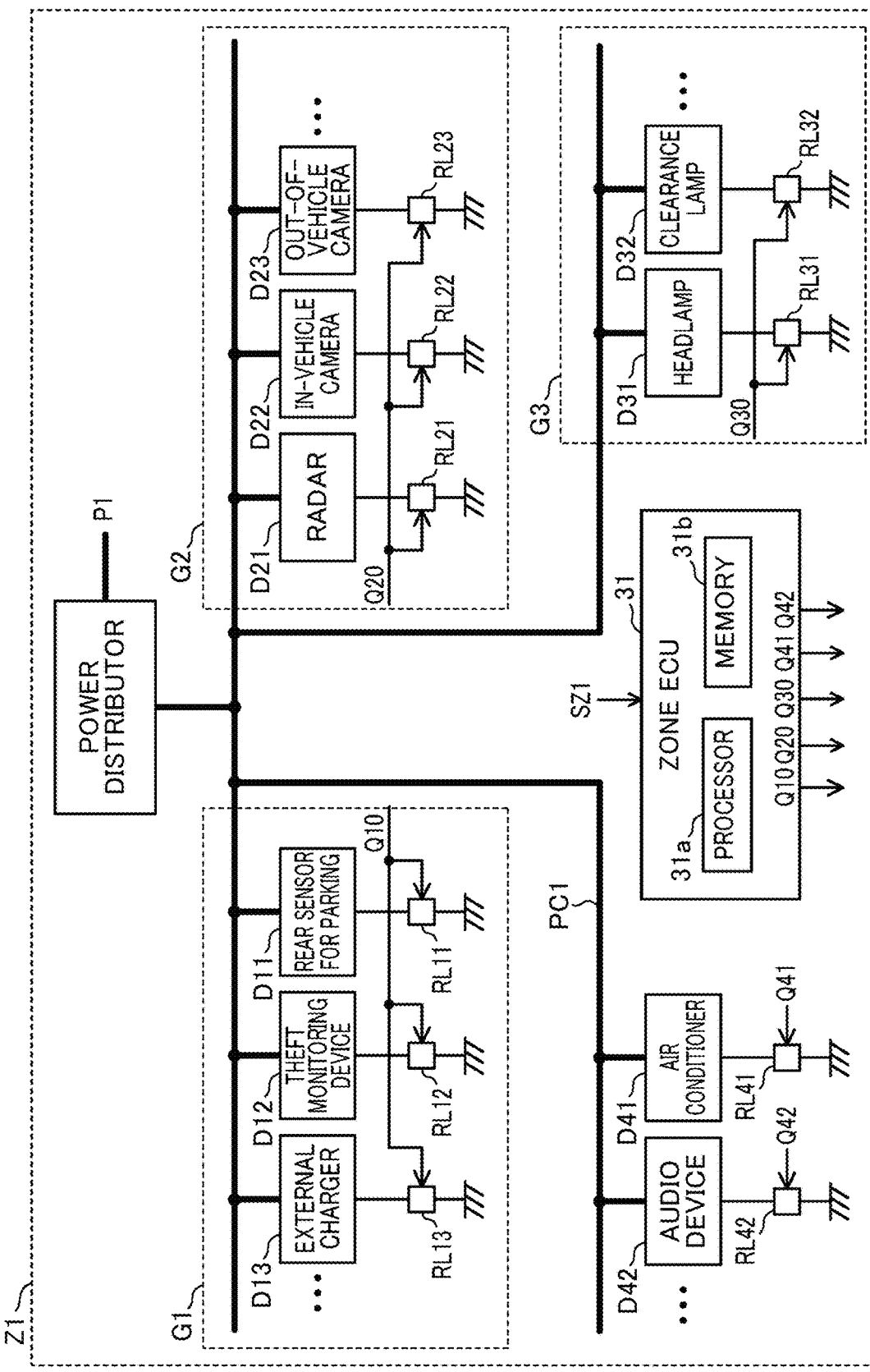
FIG. 4 is a block diagram showing another example of the power supply topology within the front left zone of the vehicle.

FIG. 4 shows an example where the individual relays RL connected to the plurality of electronic devices D belonging to the same groups in FIG. 3 are controlled by common control signal lines. Specifically, in FIG. 4, the individual relay RL11 connected to the rear sensor D11 for parking, the individual relay RL12 connected to the theft monitoring device D12, and the individual relay RL13 connected to the external charging device D13 are connected by a common control line. These individual relays RL11, RL12 and RL13 are controlled to be on and off based on common control signals Q10. Similarly, individual relays RL21, RL22, and RL23 corresponding to the radars D21, the in-vehicle cameras D22, and the out-of-vehicle cameras D23 are connected by a common control line and controlled to be on and off based on common control signals Q20. Individual relays RL31 and RL32 corresponding to the headlamps D31 and the clearance lamps D32 are connected by a common control line, and controlled to be on and off based on common control signals Q30.

In this manner, the wiring region necessary for wiring the control lines can be reduced using the common control lines. This configuration also simplifies control programs of the zone ECU 31 used for controlling the individual relays. The "method of controlling the individual relays" will be described later, and detailed description thereof will thus be omitted here.

Figure 5:
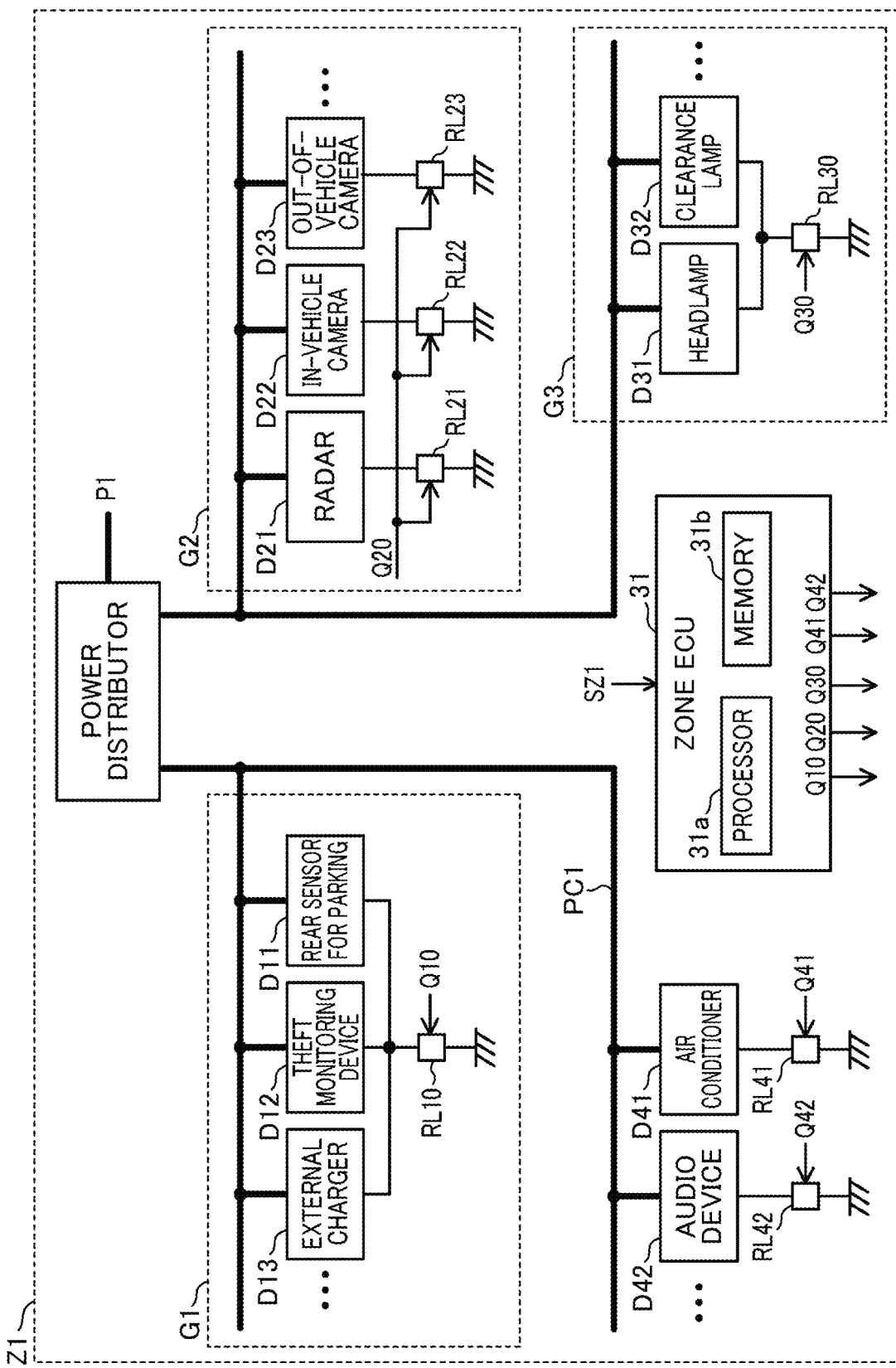
FIG. 5 is a block diagram showing further another example of the power supply topology within the front left zone of the vehicle.

FIG. 5 shows an example where the plurality of electronic devices D belonging to the same groups described above are connected to the body ground of the vehicle 10 via common individual relays RL. Specifically, in FIG. 5, the rear sensor D11 for parking, the theft monitoring device D12, and the external charging device D13 are connected by the body ground of the vehicle 10 via a common individual relay RL10. The individual relay RL10 is controlled to be on and off by the control signals Q10 output from the zone ECU 31. Similarly, the headlamps D31 and the clearance lamps D32 are connected to the body ground of the vehicle 10 via a common individual relay RL30. The individual relay RL30 is controlled to be on and off by the control signals Q30 output from the zone ECU 31. The control signals Q10 and Q30 are similar to the control signals Q described above, and detailed description thereof is omitted here. The common individual relays RL10 and RL30 may be placed, if a plurality of corresponding electronic devices are located relatively close to each other.

In this manner, the number of the individual relays RL can be reduced using the common individual relays. This configuration also simplifies the negative electrode circuit connected to the body ground.

Figure 7:
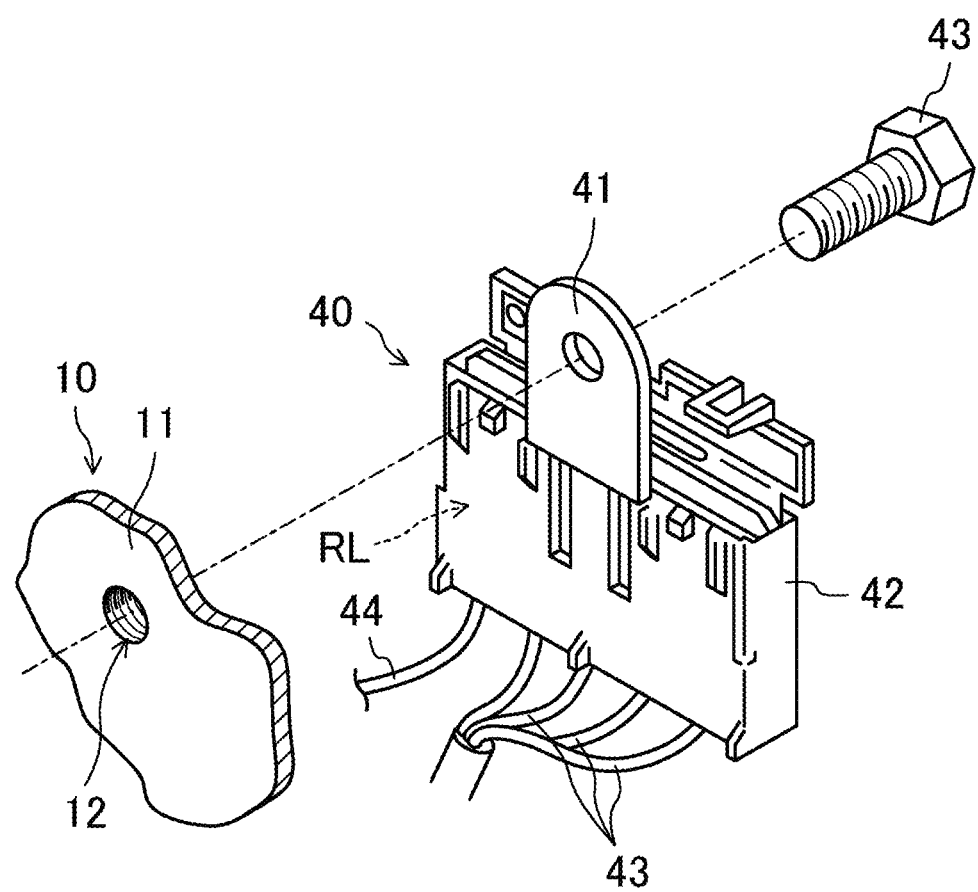
FIG. 7 is a diagram showing an example of the location of an individual relay.

In the configurations of FIGS. 1, 2, 4, and 5, the locations of the individual relays RL are not particularly limited. For example, as shown in FIG. 7, each individual relay RL may be built in one of body ground connectors 40 on the body ground. This configuration allows efficient placement of the individual relays RL. Specifically, the body ground connectors 40 are fastened and fixed to body ground points in various locations of the body of the vehicle 10. Each individual relay RL is located in, for example, a resin cover 42 of the one of the body ground connectors 40. The example, a terminal 41 of the body ground connector 40 is fastened and fixed to a screw hole 12 in a metal body 11 of the vehicle 10 using a screw 43. The terminal 41 is electrically connected to harnesses 43. The harnesses 43 are connected to ground terminals (not shown) of the electronic devices D. A signal cable 44 for supplying the control signals Q from the outside to each individual relay RL is drawn to the body ground connector 40 of the type including a built-in individual relay RL. The individual relay RL only needs to be located in an intermediate point of the electrical path from one of the electronic devices D to the body ground. The individual relay RL may be located on the electronic substrate of one of the electronic device D, and is arranged on a joint in the intermediate point of the electrical path where the electronic substrate is connected to associated one of the harnesses 43 for the body ground. The body ground of the vehicle is well known and includes the metal body 11 of the vehicle 10, for example.

<Method of Controlling Individual Relays>

Now, a method of controlling the individual relays will be described.

In the configuration of FIG. 2, each relay RL is interposed between one of the electronic devices D and the body ground of the vehicle. Assume that there is an electronic device D supplied with power which can be stopped. In this case, the zone ECU 31 controls and turns off the individual relay RL corresponding to the electronic device D to stop the power supply to the electronic device D. For example, while the vehicle travels forward, the zone ECU 31 controls and turns off the individual relay RL11 to disconnect the path between the rear sensor D11 for parking and the body ground to make the rear sensor D11 for parking non-conductive. Accordingly, no current (e.g., no standby current or no dark current) flows to the rear sensor D11 for parking.

Next, a method of controlling the individual relays using the table of FIG. 3 will be described. Where to store the table of FIG. 3 is not particularly limited. For example, the table may be stored in advance in a storage unit (i.e., the memory 31b) built in the zone ECU 31 or may be stored in another storage unit (e.g., the memory 30b) in the vehicle 10.

The zone ECU 31 refers to the table of FIG. 3, for example, and controls the plurality of electronic devices D simultaneously in accordance with the scenes. As described above, the zone ECU 31 determines the information on the scenes from time to time based on the scene information transmitted from the main arithmetic unit 30, for example.

For example, assume that the vehicle travels forward (the scene is hereinafter referred to as a "travel scene of the vehicle"). At this time, the zone ECU 31 refers to the group G1 in FIG. 3 and controls and turns off the individual relays RL corresponding to the electronic devices D unused in the travel scene of the vehicle. In the example of FIG. 3, the zone ECU 31 controls and turns off the individual relays RL11 to RL13. Accordingly, the rear sensor D11 for parking, the theft monitoring device D12, and the external charging device D13 are disconnected from the body ground. The zone ECU 31 controls and turns off the individual relays RL11 to RL13 using control signals Q11 to Q13 in the configuration of FIG. 2 and the control signals Q10 in the configurations of FIGS. 4 and 5. Similarly, for example, while the vehicle stops without any occupant, the zone ECU 31 refers to the group G2 in FIG. 3 and controls and turns off the individual relays RL21 to RL23. Accordingly, the radars D21, the in-vehicle cameras D22, and the out-of-vehicle cameras D23 are disconnected from the body ground.

As described above, in the present embodiment, the combination table of the electronic devices D unused in common in some scenes is stored in advance in the storage unit, for example, and referred to by the zone ECU 31 to collectively control the plurality of individual relays RL. With this configuration, what is controlled in each vehicle can be changed by varying the table, that is, for example, the power management for each vehicle grade can be set simply by varying the table.

Next, a method of controlling the individual relays using the table of FIG. 6 will be described. Like the table of FIG. 3, where to store the table of FIG. 6 is not particularly limited. For example, the table is stored in a storage unit (not shown) in the zone ECU 31 or any other place.

The table of FIG. 6 is obtained by listing up combinations of the electronic devices unused simultaneously. Specifically, FIG. 6 shows a list of electronic devices D in the following relationship. While one electronic device group M1 is used, the other electronic device group M2 is unused. While the other electronic device group M2 is used, the one electronic device group M1 is unused. In another point of view, in FIG. 6, the electronic devices listed in the same row in the electronic device group M1 are used or unused simultaneously. The same applies to the electronic device group M2. The electronic devices D, of the electronic device group M2, listed in the same row are used or unused simultaneously.

Specifically, in the first row of FIG. 6 (Y1 in FIG. 6), a keyless entry system and the theft monitoring device listed in the electronic device group M1 are not used simultaneously with the steering system and the brake system listed in the electronic device group M2. More specifically, while the vehicle 10 stops in a parking lot or any other place and the occupant(s) is/are out of the vehicle 10, the keyless entry system and the theft monitoring device need to be in an operable state (including a standby state) with the power supplied. On the other hand, the keyless entry system and the theft monitoring device are unused while the vehicle 10 travels. The power supply may thus be shut off without any problem. The steering system and the brake system are unused while the vehicle 10 stops in a parking lot or any other place and the occupant(s) is/are out of the vehicle 10. The power supply may thus be shut off without any problem.

On the other hand, while the vehicle 10 travels, the steering system and the brake system need to be in an operable state (including a standby state) with the power supplied.

Based on the table of FIG. 6, in use of one of the groups of the electronic devices unused simultaneously, the zone ECU 31 shuts off the power supply to the electronic devices of the other group. For example, in the example of FIG. 6, the zone ECU 31 shuts off the power supply to the keyless entry system and the theft monitoring device (i.e., in the electronic device group M1) when at least one of the steering system and the brake system (i.e., in the electronic device group M2) operates with the power supplied. How to shut off the power supply is not particularly limited. For example, the individual relays RL may be interposed between the electronic devices D described above and the body ground of the vehicle 10 so that the zone ECU 31 turns on or off the individual relays RL to shut off the power supply.

At this time, as shown in FIG. 4, the electronic devices D belonging to the electronic device group M1 may be controlled by the common control signals Q. Alternatively, as shown in FIG. 5, the electronic devices D belonging to the electronic device group M1 may be connected to the body ground of the vehicle 10 via the common individual relays RL. The same applies to the electronic device group M2.

FIG. 6 shows, in addition to the above-described Y1, three examples (Y2, Y3, and Y4) of the groups M1 and M2 of the electronic devices unused simultaneously.

FIG. 6 illustrates, in Y2, a power lift gate and a power sliding door in the electronic device group M1, and door glass regulators for raising and lowering respective door glasses, wipers, and washers in the electronic device group M2. For example, when the power sliding door operates, the power supply to the door glass regulator is shut off not to catch an arm or any other body part of the occupant(s). In this manner, the configuration and control according to the present embodiment are used for electronic devices that are unused simultaneously and would better operate not simultaneously. While one electronic device group operates, the power supply to the other electronic device group can be shut off, that is, the operation of the other electronic device group stops more reliably.

FIG. 6 illustrates, in Y3, an electric parking brake in the electronic device group M1, and a 4WD coupling system (e.g., a multi-plate electromagnetic clutch) in the electronic device group M2. Although not limited to the electric parking brake and the 4WD coupling system, a plurality of devices or circuits may be used in combination to fulfil certain functions. In this case, a predetermined functional configuration (e.g., the electric parking brake) may be implemented by an electronic device group including a plurality of electronic devices or electronic circuits which are also included in the "electronic device groups" according to the present disclosure.

FIG. 6 illustrates, in Y4, the keyless entry system and the theft monitoring device in the electronic device group M1, and an audio device and an infotainment display are in the electronic device group M2. In this manner, in the table of FIG. 6, the electronic devices of one of the groups may overlap. In addition, some of the electronic devices in each of the electronic device groups M1 and M2 may overlap. For example, a plurality of individual relays RL may be provided for the overlapping devices to allow operations corresponding to control of the respective rows.

To sum up, the on-board network system according to the present embodiment includes, for each predetermined zone of the vehicle, the zone ECU 31, the power distributor 21 connected to the on-board battery 20, and the plurality of electronic devices D supplied with the power from the power distributor 21 via the common power supply line PC. Each of the individual relays RL is interposed between one of the electronic devices D and the body ground of the vehicle 10 to individually turn on and off the connection between the electronic device D and the body ground based on the control signals Q from the zone ECU 31.

In this manner, each of the individual relays RL is interposed between one of the electronic devices D and the body ground of the vehicle 10. Accordingly, the zone ECU 31 individually shuts off the unused electronic devices D in accordance to the scenes, for example. As a result, the power supply to the unused electronic devices D stops, which reduces unnecessary standby currents or dark currents flowing to the unused electronic devices D.

Here, in order to individually turn on and off the power supply of to the electronic devices D, connecting the power distributors 21 and all the electronic devices D by individual power supply lines is conceivable. There is, however, a need to prepare the number of the wire harnesses corresponding to the number of the electronic devices. By contrast, in the configuration according to the present embodiment, the unused electronic devices D can be individually disconnected while the power distributor 21 and the plurality of electronic devices D are connected by the common power supply lines PC. There is thus no need to prepare a great number of wire harnesses to achieve the individual disconnection of the electronic devices D.

In the embodiment described above, each electronic device D may belong to a plurality of groups G. In this case, the individual relays RL may be, between the electronic device D and the body ground of the vehicle, connected in series according to the number of groups. The power supply may be shut off based on the control signals according to the groups G.

FIG. 3 shows the example of using the table obtained by grouping the electronic devices unused simultaneously in the respective scenes, the table is not limited thereto. For example, the table may be prepared by grouping the electronic devices used simultaneously in specific scenes or by grouping the electronic devices used and unused in common in scenes.

INDUSTRIAL APPLICABILITY

The technology disclosed herein is useful as an on-board network system.

DESCRIPTION OF REFERENCE CHARACTERS

10 Vehicle
21 Power Distributor
31 Zone ECU (Zone Control Unit)
D Electronic Device
PC Common Power Supply Line
RL Individual Relay
Z Zone

The invention claimed is:

1. An on-board network system comprising:
 for each of a plurality of zones defined in a vehicle,
  a power distributor connected to an on-board battery,
  a plurality of electronic devices supplied with power from the power distributor via a common power supply line, and
  zone control circuitry configured to control the plurality of electronic devices; and
 individual relays each between one or more of the electronic devices and a body-ground point of the vehicle to individually turn on and off connection between the one or more of the electronic devices and the body-ground point based on a control signal from the zone control circuitry, wherein
 a group of the electronic devices that is turned on and off at a common timing in each of the zones is collectively connected to the body-ground point via a single one of the individual relays, and
 the single one of the individual relays individually turns on and off connection between the group of the electronic devices and the body-ground point based on the control signal.

2. The on-board network system of claim 1, wherein
 the vehicle includes a body-ground connector electrically connected to a metal body of the vehicle and connectable to a ground wire of each of the electronic devices, and
 each of the individual relays is built in the body-ground connector.

3. The on-board network system of claim 1, wherein
 the single one of the individual relays turns off the group of the electronic devices in a certain scene of the vehicle, the certain scene representing a status of the vehicle and/or environment inside and outside the vehicle.

4. The on-board network system of claim 3, further comprising:
 a memory that stores information indicating a relationship between the group of the electronic devices and the certain scene, wherein
 the zone control circuitry is further configured to control the single one of the individual relays to turn off the group of the electronic devices based on the information stored in the memory.

5. The on-board network system of claim 3, wherein
 the zone control circuitry is further configured to store information indicating a relationship between the group of the electronic devices and the certain scene, and control the single one of the individual relays to turn off the group of the electronic devices based on the information that is stored.

6. The on-board network system of claim 1, wherein
 the single one of the individual relays turns off the group of the electronic devices under a condition that a second group of the electronic devices is turned on.

7. The on-board network system of claim 6, further comprising:
 a memory that stores information indicating a relationship between the group of the electronic devices and the second group of the electronic devices, wherein
 the zone control circuitry is further configured to control the single one of the individual relays to turn off the group of the electronic devices based on the information stored in the memory.

8. The on-board nets pork system of claim 6, wherein
 the zone control circuitry is further configured to store information indicating a relationship between the group of the electronic devices and the second group of the electronic devices, and control the single one of the individual relays to turn off the group of the electronic devices based on the information that is stored.

9. A vehicle comprising:
a metal body;
an on-board battery; and
an on-board network system that includes
for each of a plurality of zones defined in a vehicle,
  a power distributor connected to the on-board battery,
  a plurality of electronic devices supplied with power from the power distributor via a common power supply line, and
  zone control circuitry configured to control the plurality of electronic devices, and
individual relays each between one or more of the electronic devices and the metal body of the vehicle to individually turn on and off connection between the one or more of the electronic devices and the metal body based on a control signal from the zone control circuitry, wherein
a group of the electronic devices that is turned on and off at a common timing in each of the zones is collectively connected to the metal bod via a single one of the individual relays, and
the single one of the individual relays individually turns on and off connection between the group of the electronic devices and the metal body based on the control signal.

10. The vehicle of claim 9, wherein
the vehicle includes a connector electrically connected to the metal body of the vehicle and connectable to a ground wire of each of the electronic devices, and
each of the individual relays is built in the body ground connector.

11. The vehicle of claim 9, wherein
the single one of the individual relays turns off the group of the electronic devices in a certain scene of the vehicle, the scene each representing a status of the vehicle and/or environment inside and outside the vehicle.

12. The vehicle of claim 11, further comprising:
a memory that stores information indicating a relationship between the group of the electronic devices and the certain scene, wherein
the zone control circuitry is further configured to control the single one of the individual relays to turn off the group of the electronic devices based on the information stored in the memory.

13. The vehicle of claim 11, wherein
the zone control circuitry is further configured to store information indicating a relationship between the group of the electronic devices and the certain scene, and control the single one of the individual relays to turn off the group of the electronic devices based on the information that is stored.

14. The vehicle of claim 9, wherein
the single one of the individual relays turns off the group of the electronic devices under a condition that a second group of the electronic devices is turned on.

15. The vehicle of claim 14, further comprising:
a memory that stores information indicating a relationship between the group of the electronic devices and the second group of the electronic devices, wherein
the zone control circuitry is further configured to control the single one of the individual relays to turn off the group of the electronic devices based on the information stored in the memory.

16. The vehicle of claim 14, wherein
the zone control circuitry is further configured to store information indicating a relationship between the group of the electronic devices and the second group of the electronic devices, and control the single one of the individual relays to turn off the group of the electronic devices based on the information that is stored.

* * * * *